No. 730,127. Patented June 2, 1903.

UNITED STATES PATENT OFFICE.

ROBERT HUTCHISON, OF PRESTWICK, SCOTLAND.

GOLF-BALL.

SPECIFICATION forming part of Letters Patent No. 730,127, dated June 2, 1903.

Application filed January 31, 1903. Serial No. 141,365. (No model.)

*To all whom it may concern:*

Be it known that I, ROBERT HUTCHISON, a subject of the King of Great Britain and Ireland, and a resident of Prestwick, in the county of Ayr, Scotland, (whose postal address is Earlston, Prestwick, in the county of Ayr, Scotland,) have invented certain new Improvements in Golf-Balls, (for which I have applied for a British patent, No. 11,801, dated May 24, 1902,) of which the following is a specification.

My said invention has for its object to improve the composition and manufacture of golf-balls, so as to increase their resiliency and durability.

In carrying out my invention I employ gutta-percha or balata, which is first hardened by any known process, such as by treatment with naphtha, to extract the resins therein and to which may be added rubber in such proportion as is required, according to the hardness desired in the ball. With the materials so treated I incorporate lime in the proportion of about five per cent., by weight, though this proportion may be varied, the lime being, by preference, slaked to the consistency of a cream and added to the material while the latter is softened by heat, which should not, by preference, exceed 240° Fahrenheit. The ingredients are masticated together in any suitable known form of masticator until the water is evaporated and leaves a homogeneous mass. This addition of lime increases the dryness and toughness of the material and at the same time gives additional weight to the composition. To the resultant mass thus formed there is added such a percentage of sulfur as, aided by the lime, will vulcanize so much of the material as will give the mass the maximum elasticity obtainable without at the same time reducing its cohesive property below that at which separate pieces, while heated, preferably to a temperature of from 212° to 230° Fahrenheit, can be joined firmly together by pressure. The proportion of sulfur may vary; but one and one-half to two per cent., by weight, will be found to give good results. The vulcanizing process is carried out by subjecting the mass, by preference, in the masticator to frictional heat, whereby the temperature of the mass, which should be, by preference, below 240° Fahrenheit, is raised locally by the friction. This low temperature for the mass is below that required for the usual process of vulcanizing and has the effect of localizing the action of the sulfur. By this treatment of the mass a composition is obtained which has good cohesive property, great toughness and elasticity, and the composition can be molded in the usual manner into balls which will be found to possess increased resiliency and durability.

Instead of lime any other substance having similar properties to lime—such, for example, as baryta, strontia, or magnesia—may be employed either partially or wholly in the process, and the order in which the ingredients are added may also be varied.

Instead of forming a golf-ball entirely from my improved composition I may use the composition in the formation of any part of such a ball—as, for instance, an outer covering or an inner core—or I may use the composition as an ingredient together with other materials.

What I claim as my invention is—

1. A new composition for golf-balls or parts of golf-balls comprising hardened gutta-percha or balata and rubber, five per cent. by weight of lime, and one and one-half to two per cent. by weight of sulfur.

2. A new composition for golf-balls or parts of golf-balls comprising hardened gutta-percha or balata, five per cent. by weight of lime, and one and one-half to two per cent. by weight of sulfur.

3. A new composition for golf-balls or parts of golf-balls comprising hardened gutta-percha or balata, rubber, lime and sulfur.

4. A new composition for golf-balls or parts of golf-balls comprising hardened gutta-percha or balata, lime and sulfur.

In testimony whereof I have signed my name to this specification in the presence of two subscribing witnesses.

ROBERT HUTCHISON.

Witnesses:
GEORGE PATTERSON,
WILFRED HUNT.